US008200273B2

(12) United States Patent
McFarland

(10) Patent No.: US 8,200,273 B2
(45) Date of Patent: Jun. 12, 2012

(54) BINDING WIRELESS DEVICES IN A BUILDING AUTOMATION SYSTEM

(75) Inventor: Norman R. McFarland, Palatine, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/953,244

(22) Filed: Nov. 23, 2010

(65) Prior Publication Data

US 2011/0070904 A1 Mar. 24, 2011

Related U.S. Application Data

(62) Division of application No. 12/629,548, filed on Dec. 2, 2009, now abandoned, which is a division of application No. 10/915,034, filed on Aug. 9, 2004, now Pat. No. 7,860,495.

(51) Int. Cl.
*H04B 7/00* (2006.01)
(52) U.S. Cl. ......... 455/522; 455/41.2; 455/69; 455/419; 455/420; 370/310.2; 370/311; 370/318; 370/328; 370/338; 340/539.1; 340/539.11; 340/539.21; 340/539.22; 340/539.3
(58) Field of Classification Search .......... 455/69, 455/522, 419, 420, 41.2; 370/310.2, 311, 370/318, 328, 338; 340/539.1, 539.11, 539.14, 340/539.17, 539.21, 539.22, 539.26, 539.3, 340/540, 545.3
See application file for complete search history.

(56) References Cited

U.S. PATENT DOCUMENTS
5,587,705 A 12/1996 Morris
(Continued)

FOREIGN PATENT DOCUMENTS
DE 101 54 146 A1 6/2003
(Continued)

OTHER PUBLICATIONS

Ramanathan et al, Toplogy Control of Multihop Wireless Networks Using Transmit Power Adjustment, Infocom 2000, 19th Annual Joint Conference of the IEEE Computer and Communications Societies Proceedings, Tel Aviv, Israel, Mar. 2000, vol. 2, pp. 404-414.*

(Continued)

*Primary Examiner* — Olumide T Ajibade Akonai

(57) ABSTRACT

On a first level of the wireless building automation architecture, sensors and associated actuators communicate directly. The sensor performs control processes appropriate for the sensor and regardless of the type of actuator being used. The actuator performs control processes specific to the actuator regardless of the type of sensor being used. By direct wireless communication between sensors and actuators, the opportunity for a failed communications link using a hub and spoke arrangement may be avoided. Communication redundancy is provided by receiving the outputs of sensors at a controller, such as a controller on a second high speed or high bandwidth tier of the architecture. Regional control is implemented in the higher level tier. The higher level tier may override or control operation of components of the lower level tier as needed. The distributed control processing allows for more convenient room level integration. Where a problem is detected, such as a fire, corrective action begins within the immediate region of the sensor generating an alarm signal. The corrective action occurs without routing the alarm signal to upper levels of control processes or across different systems. The alarm signal is also propagated to upper level control systems for generating appropriate responses in other zones. To provide the different zones and avoid interference, the transmit power of the sensors and actuators is controlled as a function of two or more other devices.

16 Claims, 2 Drawing Sheets

U.S. PATENT DOCUMENTS

| | | | |
|---|---|---|---|
| 5,668,446 A | 9/1997 | Baker | |
| 5,774,052 A * | 6/1998 | Hamm et al. | 340/540 |
| 5,777,551 A | 7/1998 | Hess | |
| 5,841,360 A | 11/1998 | Binder | |
| 5,844,888 A | 12/1998 | Markkula, Jr. et al. | |
| 6,134,303 A | 10/2000 | Chen | |
| 6,144,161 A | 11/2000 | Kimmich et al. | |
| 6,182,130 B1 | 1/2001 | Dolin, Jr. et al. | |
| 6,208,905 B1 | 3/2001 | Giddings et al. | |
| 6,294,992 B1 * | 9/2001 | Addy et al. | 340/539.3 |
| 6,326,926 B1 | 12/2001 | Shoobridge et al. | |
| 6,414,968 B1 | 7/2002 | Sutterlin et al. | |
| 6,437,692 B1 | 8/2002 | Petite et al. | |
| 6,493,739 B1 | 12/2002 | Dolin, Jr. et al. | |
| 6,580,950 B1 | 6/2003 | Johnson et al. | |
| 6,727,816 B1 | 4/2004 | Helgeson | |
| 6,735,448 B1 * | 5/2004 | Krishnamurthy et al. | 455/522 |
| 6,741,174 B2 | 5/2004 | Rhoades et al. | |
| 6,741,571 B1 | 5/2004 | Sutterlin et al. | |
| 6,826,607 B1 * | 11/2004 | Gelvin et al. | 709/224 |
| 6,891,838 B1 | 5/2005 | Petite et al. | |
| 6,970,714 B2 * | 11/2005 | D'Souza et al. | 455/522 |
| 7,012,524 B2 | 3/2006 | Hisano et al. | |
| 7,012,534 B2 | 3/2006 | Chaco | |
| 7,042,352 B2 | 5/2006 | Kates | |
| 7,274,907 B1 * | 9/2007 | Perotti et al. | 455/11.1 |
| 7,277,414 B2 * | 10/2007 | Younis et al. | 370/338 |
| 7,339,957 B2 | 3/2008 | Hitt | |
| 7,400,899 B2 * | 7/2008 | Shin et al. | 455/522 |
| 7,412,338 B2 * | 8/2008 | Wynans et al. | 702/61 |
| 2002/0050932 A1 | 5/2002 | Rhoades et al. | |
| 2002/0163428 A1 | 11/2002 | Weng | |
| 2003/0003905 A1 | 1/2003 | Shvodian | |
| 2003/0012168 A1 | 1/2003 | Elson et al. | |
| 2003/0151513 A1 | 8/2003 | Herrmann et al. | |
| 2003/0152041 A1 | 8/2003 | Herrmann et al. | |
| 2003/0203742 A1 | 10/2003 | Souza et al. | |
| 2004/0008651 A1 | 1/2004 | Ahmed | |
| 2004/0088082 A1 | 5/2004 | Ahmed | |
| 2004/0090345 A1 | 5/2004 | Hitt | |
| 2004/0144849 A1 | 7/2004 | Ahmed | |
| 2005/0113124 A1 * | 5/2005 | Syrjarinne et al. | 455/522 |
| 2005/0122231 A1 | 6/2005 | Varaiya et al. | |

FOREIGN PATENT DOCUMENTS

| | | |
|---|---|---|
| WO | 99/17477 | 4/1999 |
| WO | 00/28776 | 5/2000 |
| WO | 00/70573 | 11/2000 |
| WO | 0070572 | 11/2000 |
| WO | 02/30140 A2 | 4/2002 |
| WO | 2004/023849 | 3/2004 |

OTHER PUBLICATIONS

Dust Networks: Committed to Solutions That Work; http://www.dust-inc.com/company;/main.html; printed on Aug. 4, 2004; 6 pages.

802.15.4 IEEE Standard for Information Technology-Telecommunications and Information Exchange Between Systems . . . Published by Institute of Electrical and Electronics Engineers, Inc., NY, NY; Oct. 1, 2003; 7 pages.

Xiaohu Chen et al, "Power Adaptive Broadcasting with Local Information in Ad Hoc Networks", Network Protocols, 2003, Proceedings, 11th IEEE International Conference on Nov. 4-7, 2003, Piscataway, NJ, USA, pp. 168-178.

* cited by examiner

BINDING WIRELESS DEVICES IN A BUILDING AUTOMATION SYSTEM

CROSS REFERENCE TO RELATED APPLICATIONS

This patent is a divisional of U.S. patent application Ser. No. 12/629,548, now abandoned, filed on Dec. 2, 2009 which is a divisional of U.S. patent application Ser. No. 10/915,034 (now U.S. Pat. No. 7,860,495), filed on Aug. 9, 2004, the entire contents of which are hereby incorporated in their entirety herein for all purposes.

BACKGROUND

The present invention relates to building automation systems. In particular, a wireless building control architecture implements automation of building systems.

Building automation systems include heating, ventilation and air conditioning (HVAC) systems, security systems, fire systems, or other systems. The systems are typically formed from distributed components wired together. HVAC systems may be formed with up to three separate tiers or architectural levels. A floor level network provides general control for a particular floor or zone of a building. Controllers of the floor level network provide process controls based on sensor inputs to operate actuators. For example, a temperature sensor is read. An adjustment of a damper, heating element, cooling element or other actuator is determined by a separate controller based on a set point and the measured temperature. Other basic control functions for room comfort may be provided, such as by using single input, single output feedback loops employing proportional-integral-derivative methods. The building level network integrates multiple floor level networks to provide consistent control between various zones within a building. Panels or other controllers control distribution systems, such as pumps, fans or other central plants for cooling and heating. Building level controllers may communicate among themselves and also access floor level controllers for obtaining data. The management level network integrates control of the building level networks to provide a high level control process of the overall building environment and equipment. The controllers, such as a personal computer, provide supervisory and management of the building automation system. Single or dual level architectures may also be provided.

Wired building automation systems have substantial installation costs. Controllers on a floor level network are bound through installed wiring between sensors and actuators. In addition to the cost of installing wiring between the various devices, the maintenance and establishment of a network hierarchy also introduces additional cost. Further wiring connects floor level controllers to building level controllers and building level controllers to management level controllers. Further wiring adds additional costs and complication for networking. If a device within the system fails, the physical location of the device is determined manually, such as by following wiring runs from a controller reporting failure to a failed component. Manual maintenance may be expensive. Changes to the system may require additional wiring or rerouting of wiring, adding further costs.

To reduce costs associated with wiring, wireless architectures for building automation systems have been proposed. Wireless standards provide single tier networks or multiple tier networks for implementing a single building automation process. For example, a multi-tier wireless network emulates current wired building automation systems. A controller wirelessly communicates with sensors and associated actuators. The lower level sensors and actuators provide mere input and output functions controlled by controllers. As another example, a hub and spoke control in proposed in U.S. patent application Ser. No. 10/672,527, the disclosure of which is incorporated herein. A controller may be integrated with an actuator, a sensor or combinations thereof. An additional layer or tier uses wireless communications for management of local functions as well as management of building wide subsystems, such as chiller or building fan.

IEEE 802.15.4 standardizes wireless integrated building automation systems. Reduced function devices (RFD) with limited processing power communicate with full function devices. Full function devices (FFD) provide pier-to-pier wireless communication for controlling other reduced function devices. The standard contemplates a hub and spoke configuration between an RFD and associated FFDs while using peer-to-peer communication between FFDs.

BRIEF SUMMARY

By way of introduction, the preferred embodiments described below include methods and systems for wireless building automation control. The wireless architecture maximizes control capabilities and optional or available communications paths. On a first level of the wireless architecture, sensors and associated actuators communicate directly. The sensor performs control processes appropriate for the sensor and regardless of the type of actuator being used, and the output from the sensor is wirelessly communicated to an actuator. The actuator performs control processes specific to the actuator regardless of the type of sensor being used. By direct communication between sensors and actuators, the opportunity for a failed communications link using a hub and spoke arrangement may be avoided. Communication redundancy may be provided by also receiving the outputs of sensors at a controller, such as a controller on a second high speed or high bandwidth tier of the architecture. Regional control is implemented in the higher level tier. The higher level tier may override or control operation of components of the lower level tier as needed, such as during a communications failure or to implement a control process accounting for a larger region of operation than individual communication between sensors and actuators on the lower level tier.

The distributed control processing allows for more convenient room level integration. Where a problem is detected, such as a fire, corrective action begins within the immediate region of the sensor generating an alarm signal. The corrective action occurs without routing the alarm signal to upper levels of control processes or across different systems. The alarm signal is also propagated outward through the network to upper level control systems for generating appropriate responses in other zones.

To provide the different zones and avoid interference, the transmit power of the sensors and actuators is controlled as a function of two or more other devices. For example, a signal strength is set to provide reception of the signals at more than one device for communication redundancy, but to limit reception by more distant devices to avoid interference with communications for that distant device.

In a first aspect, a control system is provided for wireless building automation control. A first wireless network in a building has a first wireless communications protocol. A second wireless network in the building has a second wireless communications protocol different than the first wireless communications protocol. The first wireless network is operable in control, free of communications with the second wireless network, building components in response to sensors. The first network is also operable to control the building components in response to data from the second wireless network.

In a second aspect, a method is provided for wireless building automation control. Building actuator outputs are wirelessly controlled in response to sensor inputs without an intervening controller. The wireless communications for control of outputs are performed pursuant to a first communications protocol. The building actuator outputs may also be wirelessly controlled with an intervening controller in response to sensor inputs. The building actuator outputs operate free of the intervening controller in one time period and operate in response in the intervening controller in a different time period.

In a third aspect, a control system is provided for wireless building automation control. A sensor arrangement includes a sensor, a sensor processor and a radio frequency transmitter. An actuator arrangement includes an actuator, an actuator processor and a radio frequency receiver. The sensor arrangement is spaced from the actuator arrangement such that the radio frequency receiver is operable to receive information from the radio frequency transmitter. A control algorithm is distributed on both the sensor processor and the actuator processor. The portion of the control algorithm on the sensor processor is specific to the sensor and the portion of the control algorithm on the actuator processor is specific to the actuator. The sensor processor is free of control algorithms for other devices. The control algorithm is operable to control, free of input from an external controller, a parameter as a function of the sensor and the actuator.

In a fourth aspect, a method is provided for wireless building automation control. A sensor control process is performed on a sensor. The sensor control process is specific to the sensor without control processes for other sensors or other actuators. An output is wirelessly transmitted from the sensor responsive to the sensor control process. The output is received at an actuator. The actuator performs a control process as a function of the output. The actuator control process is specific to the actuator without control processes for other sensors or other actuators. The sensor and actuator control processes are operable without control from any external controller.

In a fifth aspect, a system is provided for wireless building automation control. A first building control system device has a transmitter. Second and third building control systems devices have receivers. A control processor is operable to set a transmit power of the transmitter as a function of information from both the second and third receivers.

In a sixth aspect, a method is provided for wireless building automation control. A radio frequency signal is transmitted from a building control system device. Additional building system control devices attempt receipt of the radio frequency signal. A transmit power of the transmitter is set as a function of information from the other devices.

In a seventh aspect, a method is provided for wireless building automation control. An alarm signal is wirelessly transmitted from a sensor within a room of the building. The alarm signal is directly received from the sensor at an actuator associated with the room. The actuator operates in response to the alarm signal. The alarm signal is wirelessly propagated outside the room and within the building. The alarm signal is responded to differently in another room.

In an eighth aspect, a device is provided for wireless building automation control. A first transceiver connects with a processor. The first transceiver is operable for wireless communication with building control sensors, building control actuators or combinations thereof. A second transceiver connects with the processor. The second transceiver is operable for wireless communication different than the wireless communication of the first transceiver.

The present invention is defined by the following claims, and nothing in this section should be taken as a limitation on those claims. Further aspects and advantages of the invention are discussed below in conjunction with the preferred embodiments and may later be claimed independently or in combination.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Wireless building automation control is provided for safety, environmental, security, hazard, combinations thereof or other building systems. The control processes for automation are distributed. For example, control processes are distributed between two tiers or levels of the architecture. Associations between the controllers, sensors and actuators may be modified and updated with changing needs of the system. A further distributed control is provided by allowing for direct or peer-to-peer communication between devices on a lowest level, such as sensors and actuators.

Using a two-tier architecture, one level provides for high speed, or high bandwidth communications of aggregate collections of sensors or actuator data, video or other high bandwidth data or long range communications. A lower level associated with point-to-point communications may have a lower bandwidth for communicating between specific sensors and actuators. Control processes are distributed to the controllers, sensors and actuators as appropriate for the particular operations of each device, such as using an object oriented control distribution. The sensor reports information appropriate or specific to the sensor, such as reporting the result of a comparison of a measured value to a desired or set point value. Actuators use the output sensor data to provide a response appropriate for the actuator. Controllers monitor the process or action of sensors and actuators without control in one mode of operation. In another mode of operation, the controllers override the sensor and/or actuators to alter processing based on a regional or larger area control process.

Figure 1:
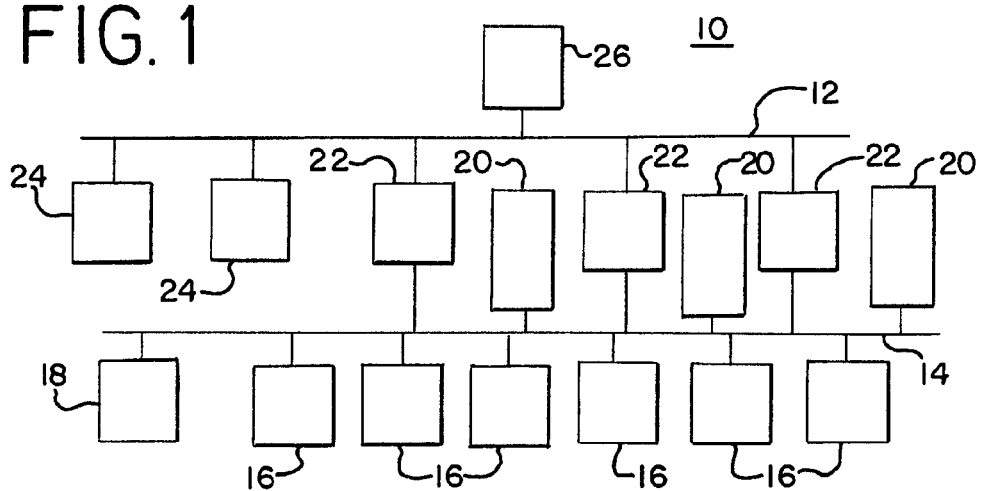
FIG. 1 is a block diagram of one embodiment of a multi-tier wireless building automation control system architecture.

FIG. 1 shows one embodiment of a control system 10 for wireless building automation control. The control system 10 includes two different wireless networks 12, 14 for use in a building. One of the wireless networks 12 is a high level control network, and the other wireless network 14 is a lower level operations network. Interfaces, routers and bridges are provided for implementing wireless network 12, 14. While shown as a common bus or interconnection structure, each of the networks 12, 14 may be associated with a plurality of different links between components with some or no redundancy in any of various patterns. Additional, different or fewer wireless networks may be provided. For example, one network is wired and another network is wireless, one or both wireless networks include wired components, or the networks may be distributed amongst only one, three or more levels.

Each network operates pursuant to different wireless communications protocols. For example, the lower level network 14 operates pursuant to the 802.15.4 communications protocols, but Bluetooth, proprietary, standard, now known or later developed wireless communication protocols may be used. The high level network 14 operates pursuant to the 802.11x protocol (e.g., 802.11a 802.11b, 802.11c . . . 802.11g), but wifi, computer network, Ethernet, proprietary, standard, now known or later developed protocols may be used. 802.15.4 and 802.11x provide medium access control and a physical interface to wireless medium. Any now known or later developed network and transport algorithms may be used. Communication, transport and routing algorithms are provided on the appropriate devices. Any packet size or data format may be used. The bandwidth for any given communications of the lower level network 14 is less than for the higher level network 12. For example, the protocol of the lower level network 14 is adapted for small data packets transmitted over short distances as compared to the higher level network adapted for larger data packets at higher rates and for longer distances. In alternative embodiments, the same communications protocol is used for both the higher level and lower level networks 12, 14.

Differences in transmit power, packet structure, bandwidth, baud rates, routing, interference avoidance, data format, distances of transmission and reception, or other network characteristics may distinguish the high level network protocol from a lower network protocol. For example, the high and low level wireless networks 12, 14 operate pursuant to a same or different collision avoidance. Any of time division multiplexing, frequency division multiplexing, spread spectrum, code division multiplexing, dynamic collision avoidance or other now known or later developed wireless interference schemes may be used. In one embodiment, the high level wireless network 12 uses CDMA interference avoidance. The low level wireless network 14 uses collision avoidance by transmitting when a channel is clear with or without frequency modulation. Routing is performed within either or both of the networks 12, 14 using any protocol, such as a MESH routing, token, or a protocol provided by Dust Networks. For example, time division multiplexing is used to assign infrequent contact times between bound components and allow for sleeping or reduced function of components at other times for saving battery life.

Different frequencies, codes or other communications differences may be used for different groups of components, such as by floor, by type (e.g., HVAC versus security or temperature versus air flow) or by other zones. By dividing up portions of the network, the communications processing load on the network may be minimized. Communications between the different nodes on the network may then be performed by adjusting a transmit and/or receive function for communication with the node of interest. By providing differences in communications for different zones, different customers in the same building may be isolated using the same wireless network. Different types of systems may be isolated from each other as well. Alternatively, the systems or customers are integrated and operate together.

The low level wireless network 14 includes a plurality of building control system devices or processors 16, 18, 20. For example, sensor arrangements 16 communicate with actuator arrangements 20 pursuant to a communications protocol for the low level wireless network 14. Paired or larger groupings of actuator arrangements 20 and sensor arrangements 16 are operable together using point-to-point or peer communications without further control by other controllers. Other processors or building devices 18 operating on the lower level network 14 include personal computers, panels, monitors, or other devices. For example, the device 18 is an actuator for controlling a building wide component, such as a chiller, boiler, building intake vent, or building air flow out take vent. A paired or grouped sensor arrangement 16 and actuator arrangements 20 are dynamically, automatically or manually associated with each other. For example, a sensor arrangement 16 within a room is bound to a actuator arrangement 20 associated with the room, such as for temperature sensing within the room to control a damper and/or heating or cooling elements associated with air flowing into the room. The low level network 14 controls major or building wide equipment, individual spaces or local input and output points.

In one embodiment, sensor arrangements 16, other devices 18 and/or the actuator arrangements 20 operate as full function devices of 802.15.4 allowing for dynamically assigned communications with different devices over a single or multiple communications path but without the ability to route routing communications from other devices. Reduced functionality devices of 802.15.14 are provided with the increased capability of direct communication with each other and the ability to address other devices for routing to the other device. For example, a temperature sensor arrangement 16 is provided with a plurality of network address locations to receive temperature information. The temperature sensor arrangement 16 communicates directly with an actuator arrangement 20 for implementing local control processes. Transmissions addressed to other devices, such as one or more of the controllers 22 are also transmitted. The receiving controller 22 then routes the signals to the desired or addressed controller 22. The assigned addresses may be dynamically programmed by one or more controllers 22 or are established during installation or manufacturing. By avoiding routing functions, less memory, less processing, less power and cheaper cost sensor arrangement 16 may be provided.

Figure 2:
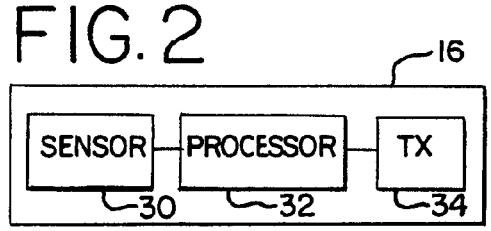
FIG. 2 is a block diagram of one embodiment of a sensor arrangement.

FIG. 2 shows one embodiment of a sensor arrangement 16. The sensor arrangement 16 includes a sensor 30, a sensor processor 32 and a transmitter 34. Additional, different or fewer components may be provided, such as providing a plurality of different or the same types of sensors. The components of the sensor arrangement 16 are connected together on a same circuit board, in a same housing, connected with a same power source or otherwise arranged for operation together. In one embodiment, the sensor 30 is spaced from the processor 32, such as connecting through a length of wire.

The sensor 30 is a temperature sensor, humidity sensor, fire sensor, smoke sensor, occupancy sensor, air quality sensor, gas sensor, $CO_2$ or CO sensor or other now known or later developed sensors, such as an oxygen sensor for use in hospitals. Micro-electro-mechanical sensors or larger sensors for sensing any environmental condition may be used. In one embodiment, the sensor 30 includes a suit of sensors for sensing multiple environmental conditions.

The processor 32 is a general processor, digital signal processor, control processor, application specific integrated circuit, field programmable gate array, analog circuit, digital circuit, combinations thereof or other now known or later developed device for implementing a control process on a signal measured by the sensor 30. The processor 32 has a processing power or capability and associated memory corresponding to the specific sensor 30 or corresponding to the needs of one of a plurality of different types of sensors 30 with a maximum desired processing power, such as an 8 or 16 bit processor. By minimizing the processor requirements and associated memory, the cost of the sensor arrangement 16 may be reduced. The processor 32 implements a control process algorithm specific to the sensor arrangement 16. Other control processes are either not stored on the sensor arrangement 16 or are stored but unused due to a specific configuration.

The transmitter 34 is a radio frequency transmitter. In one embodiment, the transmitter 34 is part of a transceiver such that control information from other components may be received by the sensor arrangement 16 to alter the implemented control process or the transmission of data. The transmitter 34 is responsive to the processor 32 or other logic for increasing or decreasing transmitted power. Alternatively, a set transmit power is used. The transmitter 34 is responsive to the processor 32 or other logic for changing a frequency, data format, interference avoidance technique or other transmission or reception property either automatically or in response to control signals.

Figure 3:
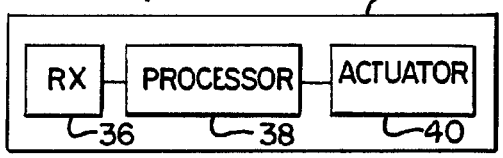
FIG. 3 is a block diagram of one embodiment of an actuator arrangement.
Figure 5:
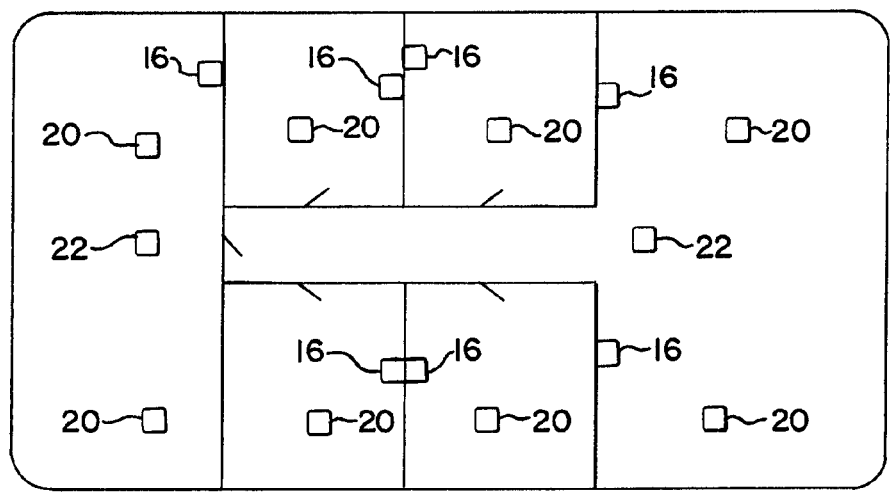
FIG. 5 is a top plan view of one embodiment of distribution of components of the wireless network of FIG. 1.

FIG. 3 shows one embodiment of an actuator arrangement 20. The actuator arrangement 20 includes a receiver 36, an actuator processor 38 and an actuator 40. Additional, different or fewer components may be provided, such as additional actuators 40 within the actuator arrangement 20. The components of the actuator arrangement 20 are positioned on the same circuit board, within a same housing, adjacent to each other, or spaced from each other. For example, the actuator 40 is a mechanical or electromechanical device attached in a separate housing to the processor 38 and the receiver 36. As shown in FIG. 5, the actuator arrangement 20 is spaced from sensor arrangement 16 such that the radio frequency receiver 36 of the actuator arrangement 20 is operable to receive information from the radio frequency transmitter 34 of the sensor arrangement 16. The actuator arrangement 16 is placed within a room or associated with a room. For example, the actuator arrangement 20 is positioned above a ceiling of a room or in a hallway near the room for controlling a damper, heating element, cooling element, sprinkler, alarm or other device.

The receiver 36 is a radio frequency receiver. In one embodiment, the receiver 36 is a transceiver for transmitting acknowledgments or other data. The receiver 36 is operable to receive information at different frequencies, different formats, or other transmitting characteristics.

The actuator processor 38 is a general processor, digital signal processor, application specific integrated circuit, field programmable gate array, analog circuit, digital circuit, combinations thereof or other now known or later developed device for implementing a control process appropriate for the actuator 40. The actuator processor 38 is of a similar processing power and memory capability as the sensor processor 32, but it may be larger or smaller. The actuator processor 38 implements a control process specific to the actuator 40 in the actuator arrangement 20. The actuator processor 38 is free of control processes for other devices, such as remotely spaced devices, sensors or other actuators. Communications protocols are also implemented by the actuator processor 38 or a separate processor, such as a protocol for measuring a received signal and transmitting a response. The algorithm may be responsive to other input signals, such as from a remotely spaced controller. Other control processors, such as for different actuator structures, may be stored in a memory but unused after configuration of the processor 38 for operation with a specific actuator 40.

The actuator 40 is a valve, relay, solenoid, speaker, bell, switch, motor, motor starter, damper, pneumatic device, combinations thereof or other now known or later developed actuating devices for building automation. For example, the actuator 40 is a valve for controlling a flow of fluid or gas in a pipe. As another example, the actuator 40 is a relay or other electrical control for opening and closing doors, actuating lights, or starting/stopping motors. As yet another example, the actuator 40 is a solenoid to open or close a door or damper, such as for altering air flow.

The lower level wireless network 14 implements local area control processes in a programmable powerful processing control language (PPCL) or other language. For example, control processes for each specific room or other region within a floor or building are implemented by the lower level wireless network 14. Building components in an area may be automatically controlled without communication from the high level wireless network 12. Since the controls are room and/or function specific, the communications of the lower level wireless network 14 are specific to the particular functions. The communications may exclude aggregate communications corresponding to packets for a plurality of sensors, actuators or combinations thereof. Each communication corresponds to individual or groups of sensor arrangements 16, actuator arrangements 20 or other devices 18.

Building components are controlled in response to sensors and free of communications with the high level wireless network 12. The control is implemented by distributing a control algorithm in an object oriented approach or specific to the device using the control algorithm. Rudimentary control algorithms are partitioned into device specific pieces for implementation by the specific devices 16, 18, 20. For example, a control algorithm is distributed on both a sensor processor 32 and an actuator processor 38 for performing a single or multiple functions. The portion of the control algorithm corresponding to a specific device 16, 18, 20 is then operated or implemented at the specific device without the need of further control. For example, a temperature within a room is controlled using a temperature sensor arrangement 16 and one or more corresponding actuator arrangements 20. One actuator arrangement 20 may be used for controlling air flow or a damper, and a different actuator arrangement 20 used for controlling a heating or cooling element. The control algorithm for the temperature function with in the room is distributed on the different sensor arrangement 16 and actuator arrangements 20. The portion of the control algorithm on the sensor processor 32 is specific to the sensor 30. For example, a measured or sensed value is compared with a manually provided, programmed in or network provided set point. The sensor arrangement 18 outputs a result of the comparison, such as information indicating that the temperature is too high or too low and by how many degrees. Different types of temperature sensors may output the same information for use by any of various different types of actuators. The sensor arrangement 16 in this corresponding control algorithm outputs information specific to the sensing function without information indicating an act to be performed. Alternatively, information corresponding to an act to be performed may be output, such as an indication of a damper function relative to a heating or cooling element function.

The portion of the control algorithm implemented by the actuator processor 36 receives the temperature information output by the temperature sensor arrangement 16. The control algorithm is specific to the actuator, such as determining an adjustment as a function of the needed or desired temperature change. Different actuators 40 may be associated with different types or amounts of adjustments to provide a given temperature change. The portion of the control algorithm specific to the actuator 40 allows determination of the appropriate adjustment without having to program other elements of the network 10 with specific characteristics of a given actuator 40.

Where more than two actuators are associated with a same room and same function, such as temperature adjustment, the corresponding actuator arrangements 20 may operate independently of each other. Alternatively, the actuators arrangements 40 have control processes that receive inputs from other actuator arrangements for automatically determining network or distributed adjustments for achieving the desired temperature change.

Other control functions may similarly be implemented by distributed control processes with device specific processing. Any input or sensing function within a feedback loop is performed by a sensor arrangement 16, such as determining a difference from a desired set point. If a sufficient magnitude of difference exists, the difference of value is transmitted. Alternatively, a command is transmitted for specific operation by a specific type of device. An actuating device 20 receives the difference value and implements a control process to bring the function within the desired operating condition. Other functions controlled with distributed control processing include fire detection, such as a smoke detector or temperature sensor for actuating an alarm or actuating control of air flow. Temperature, gas or air flow sensors may be used to actuate air flow, door position, window shade position or other motors or actuators. An occupancy sensor may be used to trigger lighting or other temperature controls. Any other now known or later developed combination of sensing by one or more senses and performing actions by one or more actuators may be used.

The low level wireless network 14 includes a plurality of actuator arrangements 20 and sensor arrangements 16. Each of the devices 16, 18 and 20 are operable to process control information specific only to the device. The sensor arrangements 16 and actuator arrangements 20 are free of control algorithms for other devices. Within a room or other area, one or multiple functions are implemented by the distributed control processes, such as security, hazard, HVAC or other automated systems. Information from a given sensor arrangement 16 may be used by different systems, such as a temperature sensor arrangement 16 being used for both HVAC as well as hazard or fire systems. The temperature sensor arrangement 16 is operable to output a same type of data for each of the different systems or different types of data. The same actuator arrangement 20 may be operable in response to different sensor arrangements 16 or different systems, such as a door release or damper actuator being responsive to an HVAC temperature sensor as well as a fire system smoke detector.

To implement a control function or process, the distributed control processes are bound together. Sensor arrangements 16 are bound to actuator arrangements 20. For example, a particular sensor arrangement 16 is bound to a particular actuator arrangement 20 within a room. Other sensor arrangements 16 and actuators 20 in other rooms, or the same room may likewise be bound together. Pairs, triplets or other groupings of various devices 16, 18, 20 are bound together. In one embodiment, the binding is implemented by network address. For example, a sensor arrangement 16 transmits information addressed to a specific actuator arrangement 20. Alternatively, particular frequency or spread spectrum coding is used. An actuator device 20 identifies a transmission as being from a specific sensor arrangement 16. In alternative embodiments, bound devices 16, 18, 20 are operated through time division multiplexing, such as a specific sensor arrangement 16 transmitting at a same time as a specific actuator arrangement 20 is operable to receive transmitted information. The binding is programmed by network communications, such as a controller 22 implementing the binding. The bindings are generated in response to user input after installation of a system. Alternatively, each of the specific devices 16, 18, 20 on the lower level network 14 are individually programmed, created, manufactured or otherwise set with a desired binding. In alternative embodiments, the devices 16, 18, 20 on the lower level network 14 are self-binding, such as identifying a closest device of a particular type for binding. The binding connections may then be adjusted or altered as needed.

Multiple bindings may be provided for any given device 16, 18, 20 of the lower level network 14. For example, a binding is assigned with a primary status with a backup binding assigned. Using acknowledgments of transmissions, a device 16, 18, 20 may recognize when there is a failure of communications, switching to the backup binding. Once sensor arrangement 16 may be bound to two actuator arrangements 20, one operating as a primary actuator and the other as a back up actuator. Similarly, an actuator arrangement 20 may be bound to multiple sensor arrangements 16 in a primary and backup configuration. As yet another example, multiple bindings are provided for implementing a given function. The bindings may be arranged in a serial communications process, such as from one sensor arrangement 16 to a first actuator arrangement 20 and then to a second actuator arrangement 20. Alternatively, a parallel or combination of parallel and series binding connections are provided.

The components of the lower level network 14 are operable to control the various functions free of input from separate controllers, such as the controllers 22 of the high level network 12. In another mode of operation, the control processes are implemented with input from the controllers 22. For example, the controllers 22 implement region wide or other modification of local processes. As another example, the devices 16, 18, 20 of the lower level network 14 implement local control only after communications failure with the higher level network 12. Alternatively, control by the higher level network 12 is provided only as needed or to override any local control. In one mode, a parameter is controlled as a function of sensors and actuators without control of the function by an external controller 22, but in another mode, communications from an external controller 22 are used to control the function and associated devices 16, 18, 20.

The high level wireless network 12 includes controllers 22, management processor or computer 26, and/or other devices 24. Additional, different or fewer devices 22, 24, 26 may be used. The devices 22, 24 and 26 are distributed throughout a building for interacting with the lower level wireless network 14, each other and users of the system 10. For example, FIG. 5 shows various controllers 22 spaced throughout a floor of a building for transmitting to and receiving from devices 16, 18, 20 of the low level wireless network 14. The devices 22, 24 and 26 of the high level wireless network 12 include processors for implementing various control functions with or without input or outputs points of building control.

Figure 4:
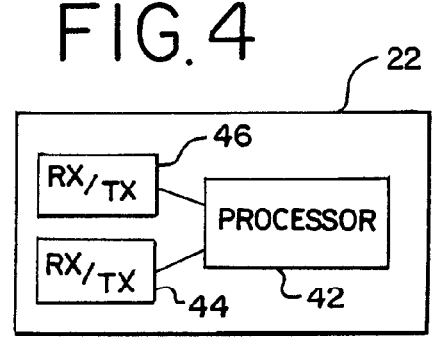
FIG. 4 is a block diagram of one embodiment of a controller.

FIG. 4 shows one embodiment of the controllers 22. The controllers 22 include one or more processors 42 and two transceivers 44, 46. Additional, different or fewer devices may be provided, such as providing a single transceiver operable to transmit and receive pursuant to one or two different communications protocols.

One transceiver 44 is operable for connecting with the lower level network 14. The transceiver 44 is operable to send and/or receive information to and/or from any of the sensor arrangements 18, actuator arrangements 20, or other devices 18. Information from various ones of the devices 16, 18 and 20 may be received at the same or different times by the transceiver 44 for aggregate processing and routing by the processor 42. The transceiver 44 is also operable to transmit information to multiple or specific ones of the devices 16, 18, 20. For example, binding associations, control instructions, communications settings or other information is transmitted.

Similarly, the transceiver 46 is operable to transmit and receive information to and from other controllers 22, or other devices 24 and 26 of the high level wireless network 12. The transceiver 46 is operable to transmit large data packets corresponding to routing of aggregate information. Similar data packets may be received for routing or use by the controller 22.

The processor 42 is an application specific integrated circuit, general processor, digital signal processor, control processor, field programmable gate array, analog circuit, digital circuit, combinations thereof or other now known or later developed device for monitoring, controlling and/or routing. In one embodiment, the processor 42 is a full function device pursuant to the 802.15.4 standard implanting a programmable power process language application. The processor 42 has a greater processing power and storage capacity than processors of the devices 16, 18 and 20 of the lower level network. For example, the processor 42 is a 16, 32 or 64 bit processor. In alternative embodiments, the processor 42 is of a same or smaller size than one or more of the devices 16, 18, 20 of the lower level wireless network 14. While individual packets of data from the lower level wireless network 14 may be routed or processed by the processor 42, the processor 42 is also operable to route or perform aggregate processing on multiple packets or a packet from multiple data sources.

The processor 42 routes data from the devices 16, 18, 20 of the lower level network 14 to devices 22, 24 or 26 of the higher level network. For example, raw data is routed for use by monitoring, reporting or region-specific control by other controllers 22. As shown in FIG. 5, the controllers 22 and other components of the high level wireless network 12 may have a greater spacing than components of the low level network 14. More than one controller 22 may be positioned to receive data from a same device 16, 18, 20 of the lower level wireless network 14. The devices 22, 24 and/or 26 are located in mechanical rooms or building infrastructure outside of occupied spaces, but may be located elsewhere in the building. The communications capability of the high level wireless network 12 is configured or provided for longer distance transmissions than on the lower level wireless network 14. In alternative embodiments, the controller 22 causes data to be routed over the lower level wireless network 14.

The management computer 26 coordinates activities of the various controllers 22. The management computer 26 is a personal computer, application-specific processor, workstation, panel or other device for receiving user input or programming for control of the system 10.

The other devices 24 may be inputs, such as from a utility, or outputs, such as printers or display monitors. In one embodiment, one or more of the other devices 24 is a high bandwidth sensor or actuator arrangement. For example, the other device 24 is a video camera or a video monitor. The increased bandwidth of the high level wireless network 22 is used to provide the high bandwidth video data. Both levels of the network 12, 14 are then used for interacting between the sensor or actuator device in other sensors and actuator arrangements 16, 20 of the lower level wireless network 14. For example, a video camera is turned on or moved to image in response to actuation by an actuator arrangement 20 or sensing by a sensor arrangement 16. For security use, the sensing of an opening or closing door may activate the other device 24 through communications through multiple levels of the network 10. As another example, actuation of a door release or sensing of a fire may also cause activation of the video camera.

The controllers 22 are operable to override operation of the bound actuator arrangements 20 and sensor arrangements 16. Individual controllers 22 or networks of the controllers 22 implement control processes for a plurality of local areas, such as a plurality of rooms. The control processes may be implemented for a wing of the building, a floor of the building, an entire building, other areas or combinations thereof. The areas are larger than the local areas addressed by specific bindings of devices 16, 18, 20 of the lower level wireless network 14. Alternatively, the areas are the same size or smaller. By implementing control processes for a plurality of local areas, the controller 22 is operable to receive or transmit aggregate communications corresponding to a plurality of sensors, actuators or both. The aggregate communications are provided in a single data package structure as compiled by the same or another controller 22. Alternatively, raw data is received from other controllers 22 acting as routers.

In overriding local control, the higher level wireless network 12 and controllers 22 are operable to instruct redirection of data, such as sensor data from the sensor arrangement 16 to the higher level wireless network 12. Alternatively, transmissions from sensor arrangement 16 are monitored by the controllers 22 without redirection or changing bindings. As another alternative, the sensor and/or actuator arrangements 16, 20 request control input from one or more controllers 22. For example, an actuator arrangement 20 receives one or more transmissions from a sensor arrangement 16. The actuator arrangement 20 forwards the transmitted information alone or in aggregate to a controller 22. The controller 22 outputs control instructions for the actuator arrangement 20 or another device or uses the transmitted information without further control output. The actuator arrangement 20 either performs the actuator specific control process without input from the controller 22, later receives control input from the controller 22 for later operation or waits until control input from the controller 22 is received.

The controllers 22 may output instructions or information for the actuator or sensor arrangements 20, 16 to control the processes for building components. By dynamically assigning control processing among the various components of the high level wireless network 12 and the low level wireless network 14, dynamic control processing is provided amongst any combinations of devices. The control processing is distributed across components 16, 18, 20 of the low level network 14 as well as between the devices 22, 24, 26 of the high level wireless network 12.

By distributing control processing for a region with the controllers 22, region wide control processes may be used to influence, override or alter the local control processing implemented as discussed above by the low level wireless network 14. For example, one or more controllers 22, other devices 24 or management computer 26 provide control processes for peak demand limiting. Peak demand limiting is used to control an overall power usage by a building, such as controlling power used by chillers, boilers, air handlers, lighting, or other building components. For example, in response to a required or requested limitation on power demands, a controller 22 or other device 24, 26 may instruct one or more sensor arrangements 16 to adjust a set point for temperature maintenance. Alternatively or additionally, an actuator device 20 or one of the other devices 24 of the higher level network 12 are operated to control a system, such as by shutting down or limiting operation of one of multiple cooling or heating plants. Another example of regional control is for variable volume and pressure control. Overall operation of a fan is based on room pressures sensed in multiple rooms. An example of regional processing are reporting for a wing, floor, building or other region. Another example for overall or aggregate control processing is providing an overall control, such controlling different zones in response to security or hazard situations. Any use of data from multiple sensors and/or actuators, such as data from multiple rooms or other aggregates of data outside of or different than the bindings established for the lower level wireless network 14, are performed by one or more controllers 22. By causing control processes for sensor arrangements 16 or actuator arrangements 20 to alter or perform differently, the controllers 22 and the associated control processes of the high level wireless network 12 are used to operate, override or influence local control processes.

Processing redundancy is provided by having multiple controllers 22. Where one controller 22 fails or communications with the controller 22 fails, the control processing implemented by the failed controller 22 may be transferred to a different controller 22. Processing may alternatively be transferred for load balancing, resource balancing or scheduled maintenance. The new address associated with the transfer to a different controller 22 is communicated to the network components in need of the information, such as transferring the address to other controllers 22 for routing, or sensor or actuator arrangements 16, 20 for addressing data intended for a specific location.

The control process implemented by the high level wireless network 12 may be hierarchal, such as having the management processor 26 or one or more of the controllers 22 implement control processes for controlling the various controllers 22. Data and processing may be redirected to the appropriate controller 22 or management computer 26 for implementing an even higher level control process. For example, more complex or more integrated building processes are performed on higher performance units. As another example, results from different control processes are input to yet another control process. Similarly, the controllers 22 may instruct the sensor arrangement 16 or actuator arrangement 20 to provide outputs different than used for the functional control of a building automation. For example, the sensor arrangement 16 is instructed to output a sensed temperature rather than the need for and magnitude of a temperature change.

The controllers 22 are operable to assign bindings and/or reassign bindings. Dynamic binding between any of the sensor arrangements 16, actuator arrangements 20 or other devices 18 with one or more controllers 22 is dynamically controlled. A binding is created as needed for implementing a particular control function or process. Other bindings may subsequently be created between different devices or with different controllers 22 as needed, such as for implementing different control functions. The regional or other integrated or aggregate control is provided in one embodiment by causing a sensor arrangement 16 to transmit to a controller 22, and the controller 22 or a different controller 22 to then provide information to an actuator arrangement 20. For example, a paired binding is disrupted to provide different combinations of devices to operate with each other. The controller 22 may include information from other sources, such as adjusting a room temperature as a function of the temperatures of adjacent rooms. The controller 22 implements processes for a region, to provide an average temperature within a wing, floor or other region. The controller 22 may override local functions or alter bindings. Similarly, a controller 22 may be assigned to specific devices 16, 18, 20 of the lower level wireless network 14. A backup controller 22 may also be assigned for use during a communications failure. Alternatively or additionally, the devices 16, 18, 20 of the lower level wireless network 14 are provided with a default binding for local control without communications from any controllers 22. Upon a communications failure with the controllers 22, the local or default bindings are implemented to provide a rudimentary or fail-safe control.

Figure 6:
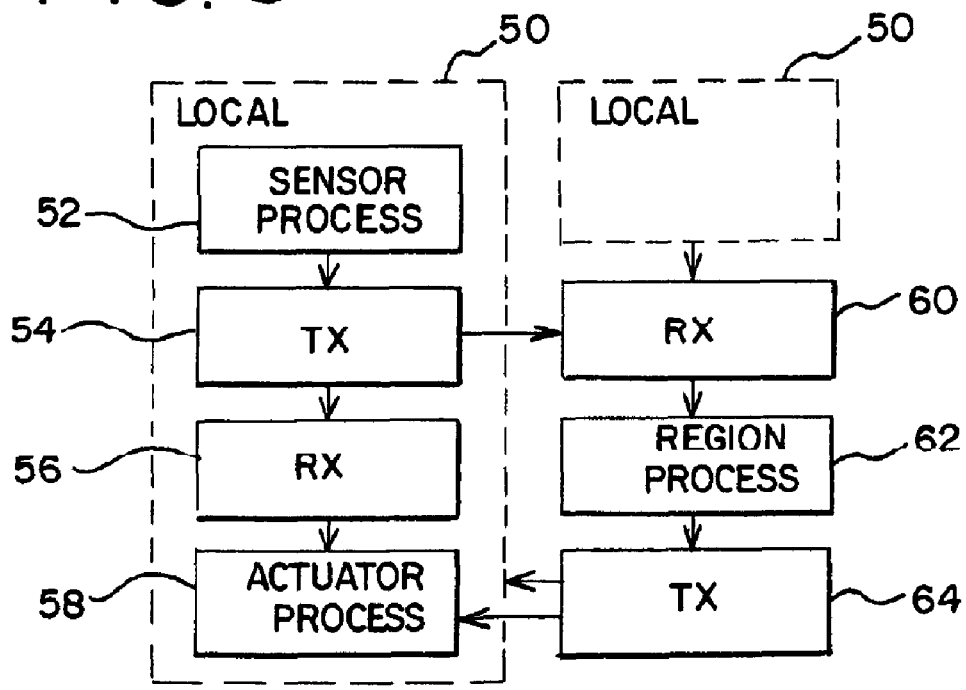
FIG. 6 is a flow chart diagram of one embodiment of a method for control in a wireless building automation system.

FIG. 6 shows one embodiment of a method for wireless building automation control. The method is implemented using the system 10 described above for FIG. 1 or different systems. Additional, different or fewer acts may be provided, such as providing addition local processes 50, additional region processing 62 or different transmit and receive schemes.

In act 50, one or more local functions are implemented. Building outputs are wirelessly controlled in response to sensor inputs without an intervening controller. Controllers associated with the sensors and actuators perform the automation without a separate controller for managing or providing control instructions for the building automation or environment function. In the local process of act 50, room level or other local area level processes are implemented. One or a plurality of different functions for controlling a building environment or providing other automated responses within a building are provided within the local process. The local process may be programmed or established in response to control instructions, but is operable subsequently without further control instructions from a separate or intervening controller. Different or the same local processes are provided for different areas, such as for different rooms. The same or different control algorithms may be used for each of the different local areas. Within a building, one, two or many more different local area processes may be performed.

In act 52, a sensor control process is performed on a sensor. The sensor control process is specific to the sensor and avoids implementing control processes for other sensors or actuators. The control process processes sensed or measured information based on the type of sensor and outputs data appropriate for the type of sensor with units and information common to any of various specific sensors of a same type. For example, a mercury-based temperature sensor converts the sensed mercury position or level into an indication of a specific temperature or an indication of an amount of difference in temperature from a set point. A micro-electromechanical temperature sensor, such as a bi-metal beam with electrical conductivity sensing, converts a current, voltage or capacitance into a temperature value. Mercury and micro-electromechanical measurements may have different values, but the resulting compared or determined output is the same for each of the two different sensors due to the control process. The common units or output allows for the switching of different sensor structures to operate with the same actuators. During maintenance or replacement of sensors, replacement of the actuators is avoided since the actuators are operable with the common output.

In act 54, the output from the sensor is wirelessly transmitted. The output from the sensor is responsive to the control process of the sensor as well as the transmit format, transmit power, binding or other communication characteristic. Using an interference control mechanism and desired transmit power, the output is provided to a desired component or plurality of components. For example, one or more actuators receives the output data. One or more controllers may also receive the transmission for monitoring the local process.

In act 56, the output is received at an actuator for local control without an intervening controller. Based on address assignment or other information indicating a binding, the actuator receives the data from a particular sensor and may discard signals from other sensors. The wireless communications performed in acts 54 and 56 are performed pursuant to a communications protocol. In one embodiment, wireless communications are performed directly between actuator outputs and sensor inputs. The communication is free of routing by a controller or other structure. In alternative embodiments, one or more sensors, actuators, controllers or other structure routes data without or with alteration between a sensor and actuator. The communications provide a desired bandwidth, such as a bandwidth minimized to save power but maximized to provide the needed standardized communication. The communications allow for wirelessly paired or otherwise grouped building actuators and sensors to be operable without further control.

In act 58, the actuator control process is performed on the actuator as a function of the output from the sensor. The standardized sensor output is converted to information for the specific structure of the actuator being used. For a given type of actuator, more than one structure may be available. The control process alters the standardized output into a setting or adjustment signal specific to the actuator. The control process of the actuator is specific to the actuator without including control processes for other sensors or other actuators. The actuator control process is performed for only controlling the given actuator. In alternative embodiments, control processes for other sensors or actuators are included on the actuator. In addition to the actuator control process, communications processes are implemented on the actuator for receiving information and/or communicating status information. For example, every time the actuator makes an adjustment, an indication of the adjustment is output for monitoring by a controller or for use by other actuators or sensors. The output is in a standard or common format for the type of actuator. Alternatively or additionally, information specific to the actuator structure used is output.

The control processes for the sensor and actuator implemented in acts 52 and 58 are performed without control in real time from an external controller. An external controller may have previously programmed a set point or other function of either the sensor or actuator, but the sensor and actuator are operable to function free of further control. A default may be provided for performing building automation function free of any or initial control.

In one mode, the local process 50 is operated free of control from another controller or another wireless network. Acts 60, 62 and 64 represent processes in a different mode where the sensor and actuator operate as a function of control from a controller or other wireless network. The controller or other wireless network is used to implement new control, regional control, override control, or other alterations in control.

In act 60, information from one or more local processes or signal processors are received. For example, a transmission of a sensor intended for a specific actuator is monitored at a different location. Act 60 also represents receiving information pursuant to a different communications protocol, such as receiving information from a management computer or other controllers. Aggregate data corresponding to a plurality of sensors, actuators or combinations thereof is communicated pursuant to the different communications protocol. A larger bandwidth is used for providing the aggregate information. The information is aggregated within a single packet structure or format or is provided as separate packets from a plurality of information sources. Different controllers may implement different control functions and communicate pursuant to the second communications protocol.

In act 64, information is transmitted to a local process. Information responsive to an intervening controller with zero, one or more other communications pursuant to a different protocol is used to generate control instructions. The control instructions are then provided to the actuator process 58, to the sensor process 52 or other process of the local processing in act 50. The output of the building actuators then respond to the wireless communication from the sensors in act 52 and/or information from the communications on a different network or pursuant to a different communications protocol.

In act 62, a regional or other process is implemented. The process allows wireless control of building actuator outputs with an intervening controller in response to sensor inputs. For example, a regional control process for a plurality of local areas is performed. Where needed, a room control or other local control process is overridden with the control process for a wing of the building, a floor of the building, the building, a plurality of local areas or combinations thereof. By overriding the operation of paired or other grouped building actuators and sensors, the controller intervenes in the local process. In other modes of operation, the controller merely monitors or originally establishes the local process without any intervening control in a building automation function.

In addition to controlling building automation functions, a regional process or other controller may alter the bindings or other communication properties. For example, data from sensor inputs are redirected to an intervening controller by establishing a binding between the controller and the sensor. The binding between the sensor and the actuator is also redirected so that the actuator receives data from the intervening controller or another controller and not the sensor. For example, redirection is performed in response to a communication failure. As another example, redirection is provided for dynamically implementing different control processes at different times. The control processing is dynamically assigned among a plurality of different components, such as components including an intervening controller or components without an intervening controller. As different regional control processes operate to affect a given function, different intervening controllers or dynamic assignments may be performed. Where a communications failure with one or more intervening controllers occurs, a different intervening controller may be bound to a given actuator or sensor. Alternatively, the actuator and sensor default to operation together without an intervening controller. Other controllers monitoring network traffic or bindings may note a communications failure. The communications failure is provided to a monitoring or reporting algorithm. The components associated with a failure may be identified and replaced with minimum efforts.

FIG. 5 shows one example of a distribution of components for building automation within a building, floor or region. Different schemes may be used to avoid interference for communications from any of the various components. In one embodiment, transmit power for the sensor arrangements 16, actuator arrangements 20 or other devices 18 of the lower level wireless network 14 shown in FIG. 1 is minimized to avoid interference.

The transmit power is set as a function of other building system control devices, such as two or more other building system control devices. The transmit power of one of the components is responsive to communications from the controllers 22 or other devices 24 of the high level wireless network 12. For example, a sensor arrangement 16 has a variable transmit power that is controlled in response to communications from one or more controllers 22. Alternatively or additionally, the transmit power of one of the components or devices 16, 18, 20 is set in response to information from other devices 16, 18, 20 on the same lower level wireless network. Devices 16, 18, 20 from a lower level wireless network 14 or devices 22, 24 or 26 from the higher level wireless network 12 may be used. For example, one or more of the receiver devices is an actuator arrangement 20. The signals or lack of signals at the two or more receivers is communicated to a control process.

The control process is located at one of the receivers, such as at a controller or at an actuator. Alternatively, the control process is located at the device transmitting to establish a transmit power. In yet another embodiment, the control process is a separate controller or device than either of the transmitter or receivers. A distributed control process may be used as well. The control process determines the transmit power of the transmitter as a function of information from two or more receivers. The control processor is operable to set a transmit power to avoid interference. For example, the transmit power is set to provide consistent or reliable reception at one device while minimizing the signal provided to another device, such as device spaced further away or on another side of a wall. By avoiding reception at the other device, less interference with signals meant for the other device may occur.

The control process may limit the transmit power for reception by a closest controller and minimize reception by other controllers. For redundant communications, the transmit power may be increased or reduced for reception by multiple devices. For example, an actuator and back up actuator are both operable to receive transmitted signals. As another example, a controller and a back up controller are operable to receive transmitted signals while minimizing the reception of signals at yet another or further spaced away controller or actuators.

Figure 7:
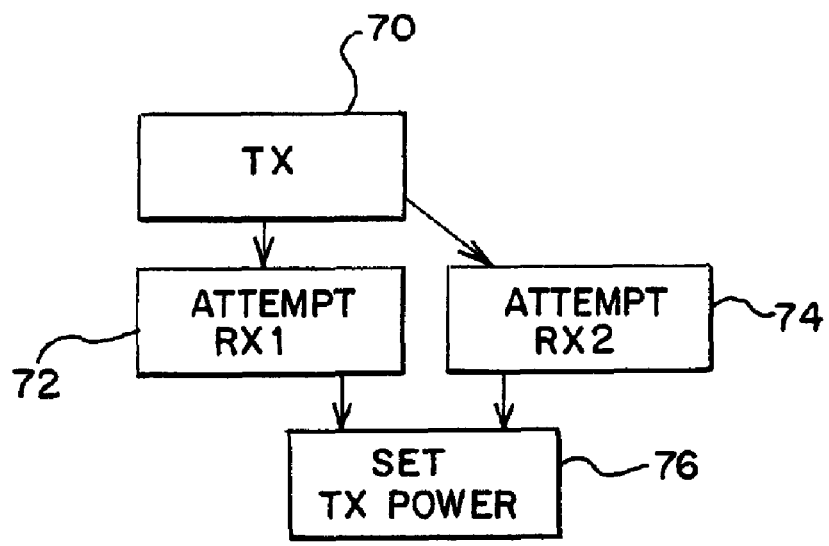
FIG. 7 is a flow chart diagram of one embodiment of a method for setting a transmit power in a wireless architecture.

FIG. 7 shows one method for determining a transmit power. The acts of FIG. 7 are implemented using the system and components of FIG. 1 or a different system or components. Additional, different or fewer acts may be provided, such as attempting to receive at third, fourth or other numbers of receivers. The transmit power of at least one sensor input, sensor arrangement or other component is set as a function of signals received or attempted to be received at a plurality of other devices.

In act 70, a radio frequency signal is transmitted from a building control system device. The signal is transmitted with a default transmit power, such as a maximum or minimum transmit power. A sensor arrangement, actuator arrangement, controller, combinations thereof or other device transmits the radio frequency signal.

In acts 72 and 74, the receipt of the frequency signal is attempted at two or more different building control system devices, such as associated with two different locations. For example, a sensor arrangement, actuator arrangement, controller, combinations thereof or other devices are used for receiving or attempting receipt of the radio frequency signal. The receive signal is measured, such as measuring an amplitude or signal-to-noise ratio of the receive signal strength. The measured information is then communicated to a control process for setting the transmit power.

In act 76, the transmit power of the transmitter is determined as a function of the information from the other building control system devices. Using a one calculation or an iterative approach, the transmit power is set in response to a single transmission or a plurality of transmissions, respectively. The measured signal strength is used to increase or decrease the transmit power to avoid interference and/or increase communications redundancy. By limiting the transmit power, transmissions with reliable communications may be received at one device but not received or received with lesser signal strength at another device, avoiding or limiting interference at the other device. The desired reception may be for any of likely bound devices, such as a controller and back up controller, an actuator and a back up actuator, and a sensor and back up sensor. By setting the transmit power to provide reliable signal strength at any of various or likely bound components, redundant communications may be provided. By limiting the signal strength, other nodes or bound groupings may operate using a same signal format, frequency or time slot. Parallel communications outside of a transmitter's sphere of influence may allow for higher network throughput. Any level of reliability for reception may be used, such as 90 percent, 95 percent or 100 percent. Less reliable settings may be used, such as where an acknowledgment signal may be provided for requesting retransmission until accurate information is received.

The controllers 22 or other devices of an upper level wireless network 12 are also configured for limited transmission range. Alternatively, the devices are configured for maximum transmission range. The same transmit power process or different transmit power processes may be used. In one embodiment, the transmit power of each controller is set to provide for reliable reception of transmitted information at at least two other controllers 22 on a same floor or on different floors.

Distributed control processing on the local level as well as between the local and regional areas may allow for more immediate response to problems and/or provide for different responses in different locations. Controllers or other devices of the upper level wireless network 12 instruct control of building components in different areas in different ways. In response to control of building components in a local area, such as by a sensor arrangement 16 and actuator arrangement 20 without interference by other controllers, the controller 22 may cause an actuator 20 in a different area to perform a function. For example, the adjustment of a damper or air flow in one room without interference from a controller may be monitored and used to control the air flow in an adjacent room to counteract pressure differential or to derive more consistent temperature adjustments. The monitoring controller or other controller interferes in the local control process of the other room to provide the adjustment.

A problem may be identified locally and dealt with locally. For example, a sensor senses a fire or smoke. This alarm triggers an immediate threat signal. Actuators corresponding to a valve for releasing water, a door release for closing a fire door, a damper for altering air flow or other actuators may respond without interference from a controller to the sensed fire. The output devices or actuators within the room are operated without authorization from a controller located outside of the room. The alarm signal may be monitored by a controller and propagated to other controllers or other actuators. For example, a controller receives the alarm signal and causes an alarm to sound in a different area in the same or different way. A less threatening alarm is sounded in a remote area to indicate that a concern may exist in the building but that the concern is not of immediate threat to the area. The propagated signal may alternatively or additionally be used for adjusting other actuators, such as fire door and air flow in adjacent or remote areas as a function of the spatial relationship to the area associated with the generated alarm or problem. As an alternative to a fire problem, a security problem may be identified. The immediate response within a local area may be the locking of doors, triggering of a security camera, moving of a security camera or activation of an audio system. The propagated signal from the local area is used to trigger actuators in other locations, such as switching a security guard monitor to view information from a location where the alarm signal was generated.

Transmitted fire, security or other signals from a sensor within a room of a building is received directly from the sensor at an actuator associated with the room. The alarm signal is received free of routing through a controller remote to the sensor and the actuator for more immediate response. Alternatively, routing within the room or even externally to the room may occur.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A system for wireless building automation control, the system comprising:
    a first building control system device having a transmitter;
    second and third building control system devices, wherein the second building control system device include a first receiver and wherein the third building control system device include a second receiver; and
    a control processor operable to set a transmit power of the transmitter as a function of information from the first and second receivers, wherein the control processor comprises a processor remote from the first, second and third building control system devices.

2. The system of claim 1 wherein the first building control system device comprises one of a sensor arrangement, an actuator arrangement, a controller and combinations thereof and wherein the second and third building control system devices each comprise one of a sensor arrangement, an actuator arrangement, a controller and combinations thereof.

3. The system of claim 2 wherein the first building control system device comprises a sensor arrangement and the second building control system device comprises an actuator arrangement.

4. The system of claim 1 wherein the control processor comprises a processor of the first building control system device.

5. The system of claim 1 wherein the control processor is operable to limit the transmit power for reception by the second building control system device and avoid reception by the third building control system device.

6. The system of claim 5 wherein the control processor is operable to limit the transmit power for reception by a closest controller.

7. The system of claim 5 wherein the control processor is operable to increase the transmit power for reception by both the second and third building control systems.

8. A method for wireless building automation control, the method comprising:
    (a) transmitting a radio frequency signal from a first building control system device;
    (b) attempting receipt of the radio frequency signal at second and third building control system devices; and
    (c) setting a transmit power of the transmitter as a function of information from the second and third building control system devices, wherein the transmit power is determined at a processor remote from the first, second and third building control system devices.

9. The method of claim 8 wherein (a) comprises transmitting from one of a sensor arrangement, an actuator arrangement, a controller and combinations thereof and wherein (b) comprises attempting receipt by the second and third building control system devices each comprising one of a sensor arrangement, an actuator arrangement, a controller and combinations thereof.

10. The method of claim 9 wherein (a) comprises transmitting from a sensor arrangement and wherein (b) comprises attempting receipt at an actuator arrangement.

11. The method of claim 8 wherein (c) comprises determining the transmit power at the first building control system device.

12. The method of claim 8 wherein (c) comprises limiting the transmit power for reception by the second building control system device and to avoid reception by the third building control system device.

13. The method of claim 12 wherein (c) comprises limiting the transmit power for reception by a closest controller.

14. The method of claim 12 wherein (c) comprises increasing the transmit power for reception by both the second and third building control systems.

15. A system for wireless building automation control, the system comprising:
    a sensor arrangement having a transmitter;
    an actuator arrangement and a third building control system device, wherein the actuator arrangement includes a first receiver and wherein the third building control system device include a second receiver; and
    a control processor operable to set a transmit power of the transmitter as a function of information from the sensor arrangement receiver and the actuator arrangement receiver.

16. A method for wireless building automation control, the method comprising:
    (a) transmitting a radio frequency signal from a sensor arrangement;
    (b) attempting receipt of the radio frequency signal at an actuator arrangement and a third building control system device; and
    (c) setting a transmit power of the transmitter as a function of information from the actuator arrangement and the third building control system device.

* * * * *